(12) United States Patent
Bremont et al.

(10) Patent No.: US 8,501,066 B2
(45) Date of Patent: Aug. 6, 2013

(54) SYSTEM AND METHOD FOR MANUFACTURING HEAT-ACTIVABLE ADHESIVE PELLETS

(75) Inventors: Michel Bremont, Gex (FR); Michel Awkal, Saint Louis (FR)

(73) Assignee: A. Raybond Et Cie, Grenoble (FR)

( * ) Notice: Subject to any disclaimer, the term of this patent is extended or adjusted under 35 U.S.C. 154(b) by 35 days.

(21) Appl. No.: 12/896,076

(22) Filed: Oct. 1, 2010

(65) Prior Publication Data

US 2012/0083578 A1   Apr. 5, 2012

(51) Int. Cl.
*D01F 1/02* (2006.01)

(52) U.S. Cl.
USPC ............... 264/211; 264/176.1; 264/211.24; 525/452; 525/453; 528/85

(58) Field of Classification Search
USPC ............. 264/176.1, 211, 211.24; 525/452, 525/453; 528/85
See application file for complete search history.

(56) References Cited

U.S. PATENT DOCUMENTS

2009/0198036 A1*  8/2009  Duffy ............................. 528/85

OTHER PUBLICATIONS

Szycher, M.; Szycher's Handbook of Polyurethanes, 1999, p. 17-18 to 17-21.*
Gierenz, G., et al.; Adhesives and Adhesive Tapes, 2001, p. 19-22.*

* cited by examiner

*Primary Examiner* — Robert Jones, Jr.
(74) *Attorney, Agent, or Firm* — Shook Hardy & Bacon LLP (57) ABSTRACT

A method and an apparatus are provided for the production of heat-activable adhesive pellets that can be formed into elements for holding an article to a surface such as a glass surface. The apparatus and method for the manufacture of the heat-activable pellets include the steps of introducing at least a first component comprising at least one difunctional polymer with at least one multifunctional polymer into an extruder, heating the first component, introducing a second component comprising isocyanate and a powder flow enhancer (such as fumed silica) at a point downstream of the introduction of the first component, combining the first and second components in the extruder to form a flowable compound, pelletizing the extruded compound exiting the extruder by cutting to form heat-activable adhesive pellets, and drying the pellets. In one embodiment of the disclosed invention a catalyst is applied to the pellets to form catalyst-coated heat-activable adhesive pellets. In another embodiment of the disclosed invention a catalyst is added into the extruder to form catalyst-containing heat-activable adhesive pellets.

35 Claims, 3 Drawing Sheets

SYSTEM AND METHOD FOR MANUFACTURING HEAT-ACTIVABLE ADHESIVE PELLETS

TECHNICAL FIELD

The disclosed invention relates generally to the manufacture of heat-activable adhesive pellets that can be formed into elements such as powders, strands, tubes, discs or tablets for holding an article to a surface such as a glass surface. More particularly, the disclosed invention relates to a system and method for the manufacture of heat-activable adhesive pellets by extrusion in which a mixture of at least two polymers is introduced into an extruder and a catalyst and an isocyanate are added at a point in the process after the introduction of the mixture of at least two polymers into the extruder.

BACKGROUND OF THE INVENTION

Attachment of a first component to a second component for any of a variety of applications may be made by any of several known methods of fastening, including mechanical or chemical fastening. Mechanical fastening, while often practical and reliable, is not always usable for every application. For example, where a first component is being attached to a second component and it is not desirable or practical to drill into or otherwise modify the second component for mechanical attachment, chemical fastening is the only other alternative. This is the case where, for example, a component is to be attached to a glass surface, the second component. An example of a component-to-glass arrangement may be seen in the automotive industry where a rear view mirror or a metal hinge needs to be attached to a glass surface. Other examples of component-to-glass attachment needs exist such as in home and office construction.

The early challenges faced by those attempting to attach a component to glass using chemical fastening included early partial or complete failure brought about due to heating-cooling cycles and ultraviolet radiation.

While modern day adhesives have generally overcome the failure of the adhesive to hold the component in place over time, problems still remain in terms of producing the adhesive material. Most known methods of production of the adhesive material are time consuming and require expensive equipment. Known methods of producing the adhesive material also suffer from a high degree of material wastage.

As in so many areas of fastener technology, there is room in the art of adhesives for adhering components to glass or other substrates for an alternative method and apparatus for preparing the adhesive composition.

SUMMARY OF THE INVENTION

The disclosed invention provides a system for producing heat-activable adhesive elements for holding an article to a surface such as a glass surface. The apparatus and method for the manufacture of the heat-activable elements include the steps of introducing a first component comprising at least two polymers into an extruder, heating the first component, introducing a second component comprising isocyanate and a powder flow enhancer (such as fumed silica) at a point downstream of the introduction of the first component, combining the first and second components in the extruder to form a flowable compound, pelletizing the extruded compound exiting the extruder by cutting to form heat-activable adhesive pellets, and drying the pellets. The mixture of at least two polymers comprises a di-functional polymer and a multi-functional polymer. The di-functional polymer is preferably a macrodiol and the multi-functional polymer is preferably a macropolyol.

A catalyst is added after the introduction of the first component into the extruder. Particularly, the catalyst may be coated on the pellets once formed according to the first embodiment of the disclosed invention or may be included with the second component for introduction into the extruder downstream of the point of addition of the first component according to the second embodiment of the disclosed invention.

In the first embodiment the formed pellets are introduced into a coating system where a catalyst solution in isopropanol is atomized to coat the pellets under a high speed air flow.

In the second embodiment the polymers are introduced into the extruder while the isocyanate and the catalyst are introduced into the extruder at a point downstream of the insertion point of the polymers. In this manner the isocyanate and the catalyst become part of the compound before exiting the extruder for pelletizing. While the isocyanate and the catalyst may be introduced into the extruder simultaneously, this would not necessarily be the case in all instances. Possible variations of the second embodiment include the introduction of the catalyst into the extruder at a point after the introduction of the polymers but before the point of introduction of the isocyanate or, in the alternative, the introduction of the isocyanate into the extruder at a point after the introduction of the polymers but before the point of introduction of the catalyst or, in the alternative, the introduction of the isocyanate and the catalyst into the extruder during the introduction of the polymers.

Regardless of the embodiment, the disclosed invention provides a cost-effective, practical and efficient way to produce heat-activable adhesive pellets that can be formed into a variety of shapes and sizes for use in attaching a component to another material such as glass.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE EMBODIMENT

In the following description, various operating parameters and components are described for the two different constructed embodiments. These specific parameters and components are included as examples and are not meant to be limiting.

The preferred methods and apparatuses for forming the heat-activable pellets of the disclosed invention are described as follows.

I. Components of the Pellet-Forming Compound

The composition of the disclosed invention provides a heat-activable adhesive pellet for use in forming elements such as powders, strands, tubes, discs or tablets for holding an article to a surface such as a glass surface. The element is pre-applied to the component for immediate or later heat-activated adhesion to, for example, vehicle glass.

In general, the heat-activable pellet of the disclosed invention is formed from at least two polymers, at least one solid di- or poly-isocyanate in powder form, and a catalyst.

Polymers

The composition preferably includes two polymers, a di-functional polymer and a multi-functional polymer. Additional polymers may be added without deviating from the spirit and scope of the disclosed invention. The preferred polymers are solid or semi solid at room temperature. The di-functional polymer contains two functional groups, such as alcohols, that are reactive with isocyanate functional groups. The multi-functional polymer contains several functional groups, such as alcohols, reactive with isocyanate functional groups. One of the selected polymers must be capable of cross-linking, and is thus the multifunctional polymer that demonstrates high mechanical performance. The polymers are neither blocked nor deactivated.

The di-functional polymers comprise macrodiols (such as poly(terepthalic acid-adipic acid-hexane diol) and/or poly (adipic acid-hexane diol)). The di-functional polymer acts as a reactive carrier. When melted, it makes contact between the other ingredients possible and it reacts simultaneously with the isocyanate. The di-functional polymer provides either flexibility or rigidity to the adhesive, depending on the ratio of either rigid or flexible units. A non-limiting example of a suitable di-functional polymer includes Dynacoll 7000™, produced by Evonik Degussa GmbH, Essen, Germany.

The multi-functional polymers comprise macropolyols (such as poly(styrene-allyl alcohol) copolymers, hydroxyl number 80-300). The multi-functional polymer cross-links with the isocyanate and thus increases mechanical properties and aging performance. Non-limiting examples of suitable multi-functional polymers include SAA-100™ and SAA101™, produced by the Lyondell Chemical Company, Houston, Tex. USA.

Isocyanate

The composition preferably includes at least one or both of di-functional molecules and multi-functional molecules. Preferably but not exclusively the di-functional molecules are di-isocyanates containing two functional groups and preferably but not exclusively the multi-functional molecules are poly-isocyanates containing several isocyanate functional groups. Both are in powder form. Additional di- or poly-isocyanates may be added without deviating from the spirit and scope of the disclosed invention. The isocyanates may be an isocyanate dimmer such as 2,4-dioxo-1,3-diazetidine-1,3-bis(methyl-m-phenylene)di-isocyanate.

The isocyanate polymerizes with the di-functional polymer(s) and cross-links with the multi-functional polymer and thus increases mechanical properties and aging performances.

It should be noted that the di-functional and multi-functional molecules do not need to be deactivated before manufacturing. In addition, the di-functional and multi-functional molecules do not need to be unblocked before bonding occurs. Accordingly, the composition does not require either a deactivated isocyanate or an agent to deactivate the isocyanate. Thus the composition as described is advantageous over known compositions for time, material and overall cost savings.

The Catalyst

The composition preferably includes a catalyst. Additional catalysts may be added without deviating from the spirit and scope of the disclosed invention. More preferably the catalyst is a tertiary amine. Most preferably the tertiary amine is 3-hydroxyquinuclidine, demonstrated to provide the fast activation. While tertiary catalyst 3-hydroxyquinuclidine is the preferred catalyst, other tertiary amine catalysts may be used. Alternatives include, but are not limited to, 4-(dimethylamino)benzoic acid, 4,6-dimethyl-2-hydroxy pyrimidine, 4-hydroxyquinazoline, 2,4-quinolinediol, methyliminodiacetic acid, N-benzyliminodiacetic acid, 3-hydroxy-2-quinoxaline carboxylic acid, 2-hydroxyquinoline, 3-acethyl-2-methyl-5H-[1]benzopyrano[2,3-b]pyridin-5-one, 3-quinolinecarboxylic acid, and 8-hydroxy-2-quinoline carboxylic acid.

The catalyst increases the speed of the reaction as is known in the art. The preferred tertiary amine catalyst is highly reactive and thus may be provided in relatively low concentrations. So efficient is the preferred tertiary amine catalyst that it accelerates establishment of the green strength time (the ability of an adhesive to be handled before completely curing) needed to obtain stability for component to hold against the substrate disclosed composition from 15 minutes, as is in known compositions to about 5 seconds at the same temperature and with the same heating process.

Flow-Enhancer

The composition preferably includes a quantity of a flow-enhancer such a fumed silica. Any of a variety of silicon dioxide products may be used, including, for example, the fumed silica Aerosil® (Evonik Degussa GmbH) made from vaporized silicon tetracholoride oxidized at a high-temperature with hydrogen and oxygen.

Optional Additives

The composition may include one or more additives. Such additives may, for example and without limitation, be selected from the group consisting of carbon black, coloring agents, and a stabilizer to provide protection against ultraviolet light. The additive[s] may be added at or near the beginning of the extrusion process, at or near the end of the extrusion process, or anywhere in between.

II. Equipment Used in Forming the Compound and Pellets

A. Extruder

The disclosed invention provides two methods for preparing an extruded composition. Both methods require the use of an extruder that is capable of receiving at least two separate mixtures, one at the beginning and one downstream of the initial insert area of the first mixture. Both methods also require the use of an extruder having separate zones from start to finish where the temperature of each zone is capable of being adjusted up or down independent of the adjacent zone. An extruder having several zones such as between about 5 and 20 is preferred. The temperatures of the extrusion in general gradually decrease from the input end to the output end and the appropriate temperature for each zone is selected accordingly. The temperature of each zone is also selected in accordance with flow requirements. Specifically, the temperature must be selected so that below the selected temperature the polymers will not soften (otherwise extrusion would not be possible) and above the selected temperature the reaction will begin inside the extruder during the extrusion process (and the extruder will be blocked). The temperature at the input end of the first zone of the extruder is higher than the adjacent second zone of the extruder with the temperature of each adjacent downstream extruder zone in sequence being lower than the adjacent upstream zone. Accordingly, the extrusion temperature is always lower than the melting temperatures of the polymers in normal pressure conditions.

It is known that a sheer that is too low may result in an unsatisfactory mixture while a sheer that is too high may damage the components. Accordingly, the profile of the extruder screw is designed so as to maximize good mixing of the components without causing damage (such as degradation) to the components themselves. The screw's profile may be inconstant through the length of the screw to achieve maximum results as is known in the art.

While both methods may be employed on the same extruder, the extruders need to be adjusted according to the requisite rotation and zone temperatures. Particularly, the set up of the extruder when used for the first method where the resulting pellets are coated with a catalyst requires the range of the individual temperatures of the zones from one end to the other be between about 100° C. and 40° C.

This above paragraph describes the extruder set up when used for the first method. When the second method is used where the catalyst is inserted into the compound while still resident in the extruder the set up of the extruder requires the range of the individual temperatures of the zones from one end to the other be between about 60° C. and 20° C.

A non-limiting example of an extruder that may be used to prepare the compositions used in both methods is the co-rotating twin screw extruder having a diameter of 45 mm available from TSA of Sondrio, Italy.

B. Pelletizer

Both methods of the disclosed invention require a pelletizer to put into pellet form the extruded component. Both methods may utilize a pelletizer having a water flow rate of about 10 m3/h and a cutter having a speed of about 200-4000 rpm. Subsequent to cutting the formed pellets are centrifuged and then air dried at about 40° C.

Beyond these common requirements there is a difference between the required pelletizers. The pelletizer used for the first method where the resulting pellets will be coated with a catalyst requires the water temperature to be lower than 35° C. The pelletizer used for the second method where the catalyst is inserted into the compound while still resident in the extruder requires a lower water temperature about 5° C.

A non-limiting example of a pelletizer that may be used to prepare the compositions used in both methods is the underwater pelletizing and centrifugal drying unit available, for example, from GALA Kunstsoff and Kautschukmaschinen GmbH of Xanten, Germany.

C. Coater

The first method of preparing heat-activable pellets according to the disclosed invention results in pellets that contain no catalyst as they emerge from the pelletizing process. Accordingly, a coater is required for coating the pellets with catalyst. The coater required to coat the pellets with catalyst is of the type where a catalyst solution in isopropanol is atomized to coat the pellets under a high speed air flow. The coater should provide the dissolved catalyst at a flow rate of between about 5 and 15 g/min (at 1 bar) and the air flow should be provided at a flow rate of between about 200 and 250 m3/h at between about 30° C. and 40° C.

A non-limiting example of a coater that may be used to coat the pellets with catalyst is available from GLATT Ingenieurtechnik GmbH, Weimar, Germany. (This apparatus is a batch fluid bed system capable of drying, granulating, coating and pelletizing.)

III. Methods of Preparing the Pellets

The disclosed invention provides two alternate methods of preparing the heat-activable adhesive pellets. In general, the first method is selected in the case of polymers having a melting temperature near the cross-linking temperature of the adhesive while the second method is selected in the case of polymers having a melting temperature at least 20° C. below the cross-linking temperature of the adhesive.

A. First Method of Preparing the Composition—Catalyst Coating

Figure 1:
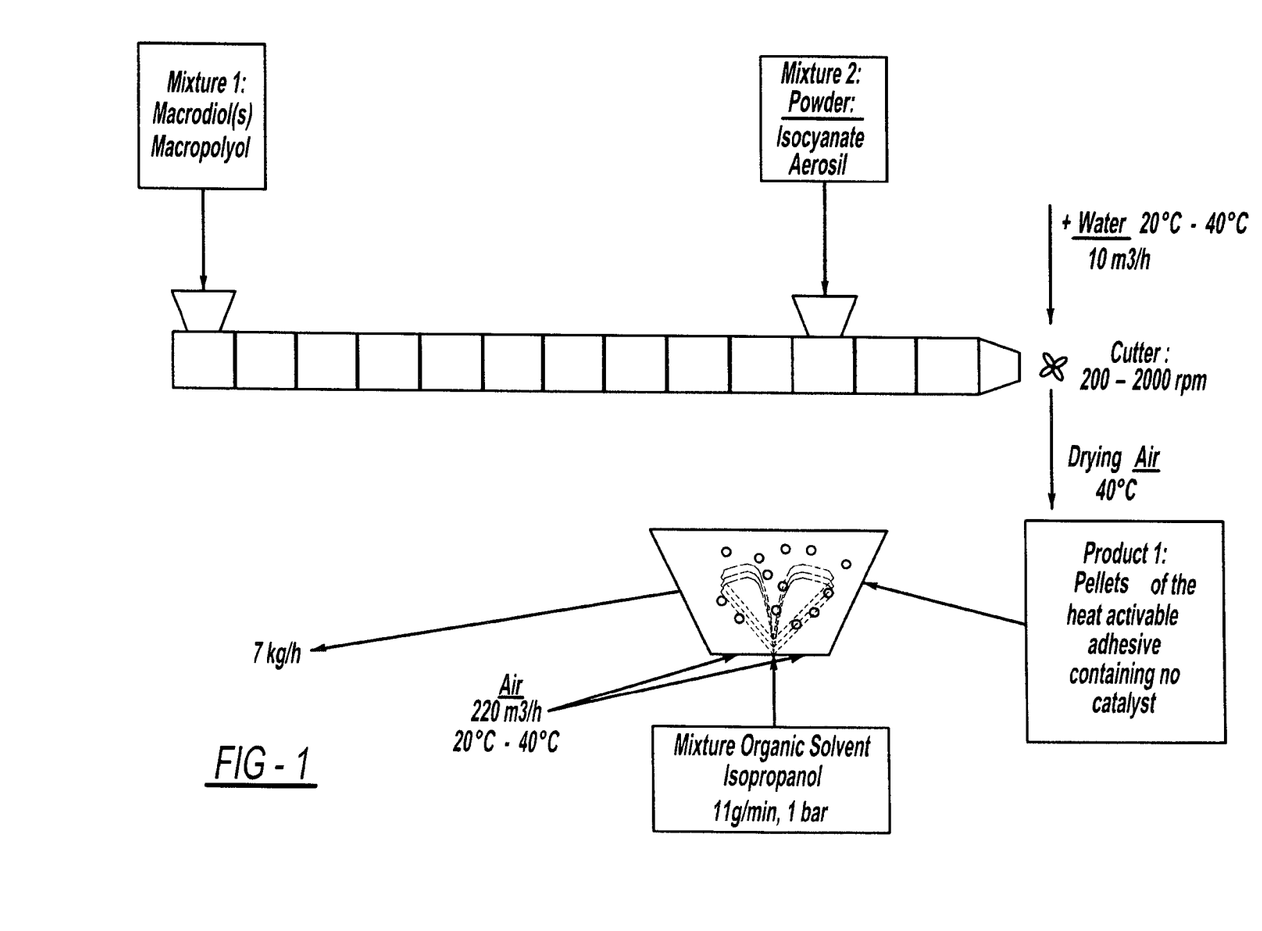
FIG. 1 is a diagrammatic illustration of a method and apparatus for preparing heat-activable adhesive pellets according to the first embodiment of the disclosed invention in which the catalyst is coated on the pellet.

The general method of preparing the composition according to the first method where the catalyst is coated on the pellet is set forth in FIG. 1 that represents a suggested but non-limiting method of preparation. As set forth in FIG. 1, initially the first part is formed by combining the at least one di-functional polymer and the multi-functional polymer according to the ratios appearing below in Table 1.

TABLE 1

| | First Part | | Second Part | | Third Part |
|---|---|---|---|---|---|
| | At least one di-functional polymer | Multi-functional polymer | Isocyanate | Fumed silica | Catalyst in solvent |
| Preferred range (%) of | 40-95 | 5-50 | 100-95 | 0-5 | 0.2-1.8 |
| More preferred range (%) of | 50-95 | 6-25 | 99.9-96.5 | 0.1-3.5 | 0.5-1.5 |
| Most preferred range (%) of | 70-85 | 7-14 | 99.8-98 | 0.2-2 | 0.8-1.2 |

The first part is prepared by combining a quantity of the first polymer with a quantity of the second polymer. The ranges of percent composition for the first part (as well as for the second and third parts) are set forth in Table 1. While identified as being preferred, more preferred, and most preferred ranges, it is to be understood that the percentage quantities set forth in Table 1 are intended as being illustrative and not as being limiting.

Once combined, the first part is inserted into the extruder. The first part is processed through the extruder with the speed of the screw adjusted to between about 125 and 225 rpm. The dual heat zones are set at temperatures that gradually decrease from the input end to the output end with the temperature of the first zone being 20° C. lower than the melting point of the polymer being inserted into the extruder. The temperatures of the next sequential zones (the next eight zones according to the example) are lower, dropping from 100° C. to 80° C. to 60° C. to 40° C.

The second part of the composition can be added to the melt at an area downstream of the insertion of the first part. The second part is prepared according to the ratio set forth in Table 1 where the range of percent composition for the second part is shown. Again, while identified as being preferred, more preferred, and most preferred ranges, it is to be understood that the percentage quantities set forth in Table 1 are intended as being illustrative and not as being limiting.

The second part is a powdered mixture of isocyanate and fumed silica (to enhance flow). It is introduced into the melted first part. The first part and the second part are inserted into the extruder according to the ratios set forth in Table 2 that are intended as being illustrative and non-limiting.

TABLE 2

|  | First Part | Second Part |
|---|---|---|
| Preferred range (%) of | 40-97 | 5-40 |
| More preferred range (%) of | 55-95 | 5-30 |
| Most preferred range (%) of | 82-92 | 8-18 |

Once the second part has been introduced into the melted first part in the extruder, it is combined with the first part to form a flowable composition and is heated to 60° C. Upon entering the last zone of the extruder where the temperature is about 40° C. the composition is fully mixed to form a single, uniform batch and is ready to exit the extruder.

Upon exiting the extruder the composition enters a water stream for pelletizing. The water is lower than 35° C. with a flow rate of between about 5 and 15 m3/h. The outflowing composition is pelletized with the speed of the cutting tools being adjusted to between about 200-4000 rpm. Subsequent to cutting the formed pellets are centrifuged and then air dryed at about 40° C. The product of the pelletizing process is a heat-activable, catalyst-free pellet.

The resulting pellets are catalyst-free heat activable adhesive. According to the first method of preparing heat-activable adhesive pellets according to the disclosed invention, the catalyst is applied as a coating on the pellets. To accomplish this step, and as illustrated in FIG. 1, the pellets are introduced into a hopper where catalyst (dissolved in isopopanol) is injected into flowing air, thus coating the pellets by spraying. The catalyst is flowed at a rate of between about 5 and 15 g/min (at 1 bar). The air flow is between about 200 and 250 m3/h with a temperature about 30° C. The suggested ratios of catalyst in isopropanol are set forth in Table 1.

Composition of Pellets

The pellets produced according to the above-described method embody the composition of parts 1, 2 and 3 (the catalyst) as set forth below in Table 3.

TABLE 3

|  | First Part | Second Part | Third Part |
|---|---|---|---|
| Preferred range (%) of | 40-97 | 5-40 | 0-2 |
| More preferred range (%) of | 55-95 | 5-30 | 0.025-1.5 |
| Most preferred range (%) of | 82-92 | 8-18 | 0.05-1 |

Example

First Method

A non-limiting example of the formation of the heat-activable adhesive pellets of the disclosed invention according to the first method is set forth hereafter.

Step 1: Formation and Heating of the First Part

An extruder provided by TSA (Sondrio, Italy) was set up for this operation. The first part was prepared by combining a di-functional polymer and a multi-functional polymer in percentages of 95% and 5% respectively. The first part was introduced into the extruder and was heated in the extruder according to the step-wise heating process shown in FIG. 1 and discussed in conjunction therewith.

Step 2: Formation of the Second Part

The second part was prepared by combining isocyanate and the fumed silica in percentages of 98% and 2% respectively.

Step 3: Formation of the Combined Composition

The second part was introduced into the extruder downstream of the area of introduction of the first part as illustrated in FIG. 1 and as discussed in conjunction therewith. The combined composition was heated according to FIG. 1 and as discussed in conjunction therewith.

Step 4: Pelletization

A pelletizer provided by GALA Kunstsoff and Kautschuk-maschinen GmbH (Xanten, Germany) was set up for this operation. Pelletization occurred as set forth above with respect to the method shown in FIG. 1 and as discussed in conjunction therewith.

Step 5: Coating of the Pellets with Catalyst

The coating of the catalyst-free pellets was undertaken using a coater provided by above-mentioned GLATT Ingenieurtechnik GmbH. The apparatus had a spouted bed insert and an internal filter system. An electric heater conditioned air flowing into the fluid bed section, the flow of that was regulated by a controlled fan. The liquid formulation was atomized by compressed air using a dual nozzle sprayer attached to the bottom of the hopper. The volume of liquid spraying from the nozzle was metered by a peristaltic pump. Coating time was generally between 4 and 22 minutes.

The resulting coated pellets were composed of 90% first part, 9.8% second part, and 0.2% third part (the catalyst).

B. Second Method of Preparing the Composition—Catalyst as Part of the Composition While the process of the first method of preparing the pellets set forth above in which the catalyst is applied after the pellets are formed is one method of preparation, it is to be understood that alternative methods may be practiced. As noted above, while the first method is preferred in the case of adhesives having polymers with a melting temperature near the cross-linking temperature of the adhesive, the second method described hereafter is preferred in the case of polymers having a melting temperature well below the cross-linking temperature of the adhesive.

Figure 2:
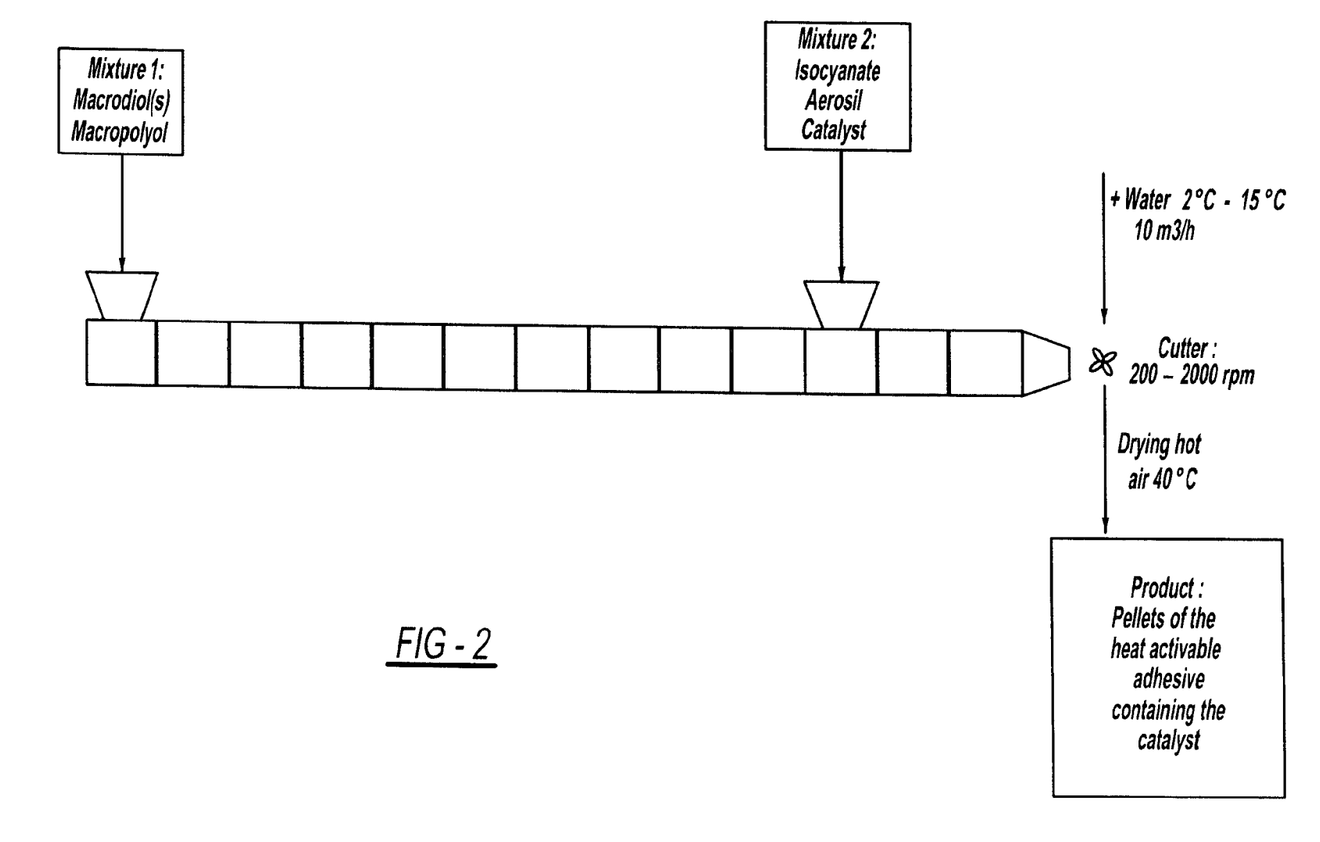
FIG. 2 is a diagrammatic illustration of a method and apparatus for preparing heat-activable adhesive pellets according to the second embodiment of the disclosed invention in which the catalyst is added to the pellet-forming compound as it moves through the extruder.

The general method of preparing the composition according to the second method where the catalyst is part of the composition and is introduced into the melt prior to exiting the extruder is set forth in FIG. 2 that represents a suggested but non-limiting method of preparation. As set forth in FIG. 2, initially the first part is formed by combining the two polymers according to the ratios appearing below in Table 4.

TABLE 4

|  | First Part | | Second Part | | |
|---|---|---|---|---|---|
|  | Di-functional polymer | Multi-functional polymer | Isocyanate | Fumed silica | Catalyst |
| Preferred range (%) of | 40-95 | 5-50 | 100-95 | 0-5 | 2-7 |
| More preferred range (%) of | 50-95 | 6-25 | 99.9-96.5 | 0.1-3.5 | 1-5 |

TABLE 4-continued

| | First Part | | Second Part | | |
|---|---|---|---|---|---|
| | Di-functional polymer | Multi-functional polymer | Isocyanate | Fumed silica | Catalyst |
| Most preferred range (%) of | 70-85 | 7-14 | 99.8-98 | 0.2-2 | 0.5-3 |

The first part is prepared by combining a quantity of the first polymer with a quantity of the second polymer. The ranges of percent composition for the first part (as well as for the second part) are set forth in Table 4. While identified as being preferred, more preferred, and most preferred ranges, it is to be understood that the percentage quantities set forth in Table 4 are intended as being illustrative and not as being limiting.

Once prepared, the first part is inserted into the extruder. The first part is processed through the extruder. The individual heat zones are set at temperatures that gradually decrease from the input end to the output end with the temperature of the first zone being 10° C. lower than the melting point of the polymer being inserted into the extruder. The temperatures of the next sequential zones (the next eight zones according to the example) are lower, dropping from 50° C. to 40° C., then to 30° C. and to 20-25° C.

The second part of the composition can be added to the melt at an area downstream of the insertion of the first part. The second part is prepared according to the ratio set forth in Table 4 where the range of percent composition for the second part is shown. Again, while identified as being preferred, more preferred, and most preferred ranges, it is to be understood that the percentage quantities set forth in Table 4 are intended as being illustrative and not as being limiting.

The second part is a powdered mixture of isocyanate, fumed silica (to enhance flow), and the catalyst. It is introduced into the melted first part. The first part and the second part are inserted into the extruder according to the ratios set forth in Table 5 that are intended as being illustrative and non-limiting. The isocyanate and the catalyst may be introduced into the extruder as the second part simultaneously or they may be introduced into the extruder at different points along the extruder such that the isocyanate is introduced into the extruder after the first part but before the point where the catalyst is introduced or the catalyst may be introduced into the extruder at a point after the first part but at a point before the introduction of the isocyanate.

TABLE 5

| | First Part | Second Part |
|---|---|---|
| Preferred range (%) of | 40-97 | 5-40 |
| More preferred range (%) of | 55-95 | 5-30 |
| Most preferred range (%) of | 82-92 | 8-18 |

Once the second part has been introduced into the melted first part in the extruder, it is combined with the first part to form a flowable composition and is adjusted to about 20-25° C. Upon entering the last zone of the extruder the composition is fully mixed to form a single, uniform batch and is ready to exit the extruder.

Upon exiting the extruder the composition enters a water stream for pelletizing. The water is at between about 5° C. and 15° C. with a flow rate of between about 5 and 15 m3/h. The outflowing composition is pelletized with the speed of the cutting tools adjusted to between 200-4000 rpm. Subsequent to cutting the formed pellets are centrifuged and then air dried at about 40° C. The product of the pelletizing process are heat-activable, catalyst-containing adhesive pellets.

Composition of Pellets

The pellets produced according to the above-described method embody the composition of parts 1 and 2 are as set forth above in Table 5.

Example

Second Method

A non-limiting Example of the formation of the heat-activable adhesive pellets of the disclosed invention according to the second method of preparation is set forth hereafter.

Step 1: Formation and Heating of the First Part

An extruder provided by TSA (Sondrio, Italy) was set up for this operation. The first part was prepared by combining a di-functional polymer and a multi-functional polymer in percentages of 90% and 10% respectively. The first part was introduced into the extruder and was heated in the extruder according to the step-wise heating process shown in FIG. 1 and discussed in conjunction therewith.

Step 2: Formation of the Second Part

The second part was prepared by combining isocyanate, the fumed silica and the catalyst in percentages of 97%, 2%, and 1% respectively.

Step 3: Formation of the Combined Composition

The second part was introduced into the extruder downstream of the area of introduction of the first part as illustrated in FIG. 1 and as discussed in conjunction therewith. The combined composition was heated according to FIG. 1 and as discussed in conjunction therewith.

Step 4: Pelletization

A pelletizer provided by GALA Kunststoff and Kautschuk-maschinen GmbH (Xanten, Germany) was set up for this operation. Pelletization occurred as set forth above with respect to the method shown in FIG. 1 and as discussed in conjunction therewith.

The resulting pellets were composed of 85% first part and 15% second part.

IV. Uses of the Pellets

The pellets produced by either the first or second method can be used as they are or may be formed by heat or compression (using, for example, a tabletizer) into a wide variety of heat-activable adhesive elements for attachment to a component (usually a metal or plastic component, although other articles requiring attachment are to be included here) for later adhesion to an item such as glass. The pellets may be formed into powder, strings, plates, tubes, discs, tablets, or any other shape useful for the purpose of article-to-glass adhesion. Once formed, attachment of the adhesive element, a tablet, for example, to the article is accomplished by heating the article itself. One possible non-limiting example of a method of attachment is to first fit the component to a simple conduction bonding tool by which the component is then heated. However, any other practical method of heating the ready-to-bond component may be used, including induction heating, infrared heating and hot air heating. The adhesive itself is hot enough at between about 60° C. and 160° C. to initiate a good reaction for bonding.

The formed pellet or other article can be pre-applied to a component in a number of ways. For example, the tablet can be at least partially inserted into a hole formed in the component followed by the application of slight pressure to the tablet to assure attachment. Again, the adhesive itself is hot enough at between about 60° C. and 160° C. to initiate a good reaction for bonding.

Use of the components having adhesive articles derived from pellets formed according to two methods of the disclosed invention avoids the need for mechanical fasteners and thus avoids the necessity of forming holes in the surface to which the component is fastened. By avoiding mechanical fasteners, multiple attachment parts that would otherwise be needed are left out.

While use of the derived adhesive articles has been generally described above as being used to attach a metal component or a plastic component to a glass surface, should be understood that the disclosed composition may find as well for bonding objects made of any one of several materials including, without limitation, metal, glass, ceramics, plastics, wood and composites. Furthermore components and surfaces of like materials may be bonded by the adhesive of the disclosed invention.

IV. Characteristics of the Articles Formed from the Pellets of The Disclosed Invention The disclosed composition has a wide variety of potential uses. Particularly, the disclosed composition is primarily but not singularly intended for use to adhere a metal component or a plastic component to vehicle glass. The components to be attached include many types of brackets and fasteners. One such component, a typical stud fastener, is illustrated in FIGS. 3 and 4.

Figure 3:
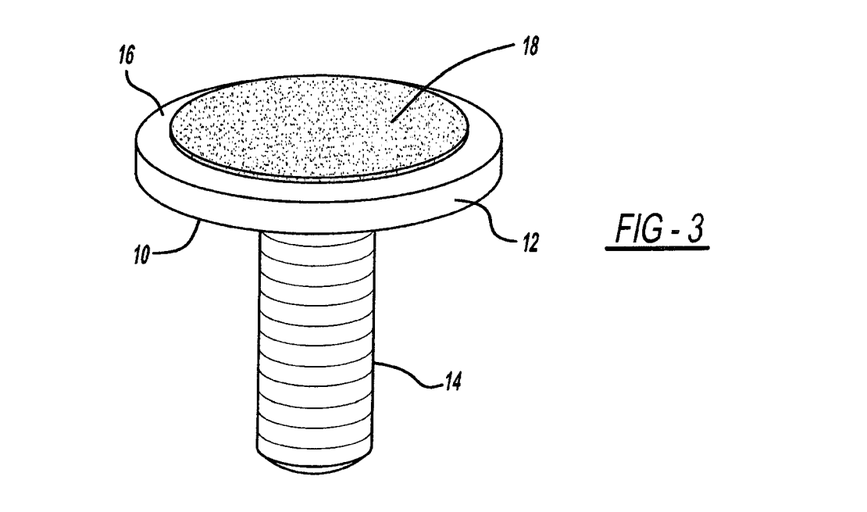
FIG. 3 is a perspective view generally showing the glass-attachment side of a component having the adhesive powder of the disclosed invention provided thereon.
Figure 4:
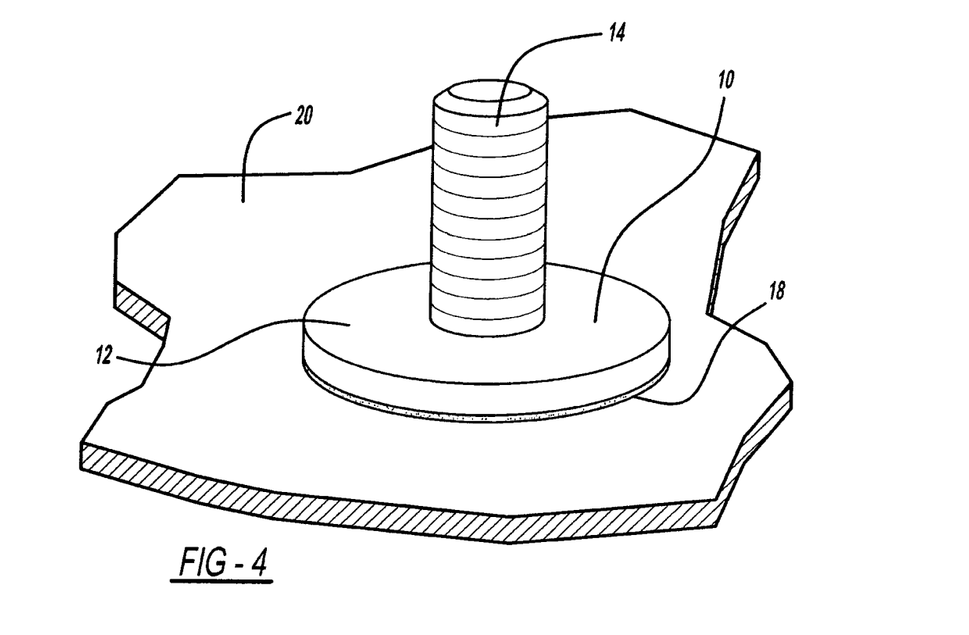
FIG. 4 is a perspective view illustrating the component of FIG. 3 attached to a portion of glass, the attachment being achieved through use of the adhesive composition of the disclosed invention.

With reference to FIG. 3, a ready-to-bond component 10 is shown. The ready-to-bond component 10 includes a body 12 and a threaded stud 14. The body 12 includes a glass-attachment side 16. A quantity of adhesive 18 of the disclosed invention is shown in place on the glass-attachment side 16 of the body 12. The quantity of adhesive 18 is attached to the glass-attachment side 16 by any of a variety of known methods, including powder pressing on a component, the component surface temperature being adjusted to between 20° C. and 140° C. depending on the characteristics of the component.

Components using articles formed from the pellets of the disclosed invention such as the above-described ready-to-bond component 10 offer several advantages over other adhesives and methods of adhesion. For example, the articles provide a solid and tack-free single component adhesive that is suitable for the bonding of a virtually unlimited number of fasteners. Fasteners fitted with the articles formed from the described pellets can be safely and easily handled at room temperature without fear of either compromising the adhesive characteristics of the composition or reduction in the amount of adhesive on the surface to be bonded. In addition, once attached, the bond demonstrates a resistance to a broad range of temperatures with a service temperature range of between 40° C. and 110° C. with a peak temperature of about 180° C. and a degradation temperature of more than 200° C.

On testing it was found that adhesives of the disclosed invention achieved green strength in less than 10 seconds and achieved a tensile strength of over 3500 N in 15 minutes (with a bonding area of 452 mm) thus providing the user with considerable time and cost savings. When tested 24 hours after initial bonding a tensile strength of 6700 N was obtained, thus these results exceed known industry strength requirements.

Furthermore, the articles formed from the disclosed pellets achieve about 80% of their final mechanical properties after 15 minutes and about 95% cured at room temperature within 60 minutes' time, thus providing the user with considerable time and cost savings. Once fully cured, the aging properties of the articles formed from the disclosed pellets meet or exceed most of known industry strength requirements.

The foregoing discussion discloses and describes exemplary embodiments of the disclosed invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method of preparing a heat-activatable adhesive pellet for use in bonding a first component to a second component, the method comprising the steps of:
   forming a first part comprising at least a first polymer and a second polymer, said first polymer being a di-functional polymer and said second polymer being a multi-functional polymer, said first and second polymers having melting points above 40° C.;
   forming a second part comprising isocyanate and a flow enhancer; introducing said first part into an extruder;
   heating said first part in said extruder;
   introducing said second part into said extruder; and
   adding a catalyst.

2. The method of claim 1 wherein said catalyst is introduced into said extruder at a point downstream of the introduction of said first part into said extruder but before the introduction of said second part.

3. The method of claim 1 wherein said catalyst is introduced into said extruder at a point downstream of the introduction of said first part into said extruder but after the introduction of said second part.

4. The method of claim 1 wherein said catalyst is combined with said second part before introduction into said extruder.

5. The method of claim 1 wherein said first and second parts form an extruded composition, said method including the step of shaping said extruded composition.

6. The method of claim 1 wherein said first and second parts form an extruded composition, said method including the step of forming pellets from said extruded composition.

7. The method of claim 6 wherein said catalyst is coated on said pellets.

8. The method of claim 7 wherein said coating of said catalyst is a spray coating.

9. The method of claim 7 wherein said pellets are formed into an article for attachment to a component attachable to another component.

10. The method of claim 1 wherein said di-functional polymer is a macrodiol and said multi-functional polymer is a macropolyol.

11. The method of claim 1 wherein said di-functional polymer is provided in the amount of between about 40% and about 95% by weight and said multi-functional polymer is provided in the amount of between about 5% and about 50% by weight.

12. The method of claim 1 wherein said catalyst is a tertiary amine.

13. The method of claim 1 wherein said flow enhancer of said second part is fumed silica.

14. A method of preparing a heat-activatable adhesive pellet for use in bonding a first component to a second component, the method comprising the steps of:
- forming a first part comprising at least a first polymer and a second polymer;
- forming a second part comprising isocyanate and a flow enhancer;
- introducing said first part into an extruder;
- heating said first part in said extruder;
- introducing said second part into said extruder;
- forming an extruded composition from said first and second parts;
- forming pellets from said extruded composition; and
- coating said pellets with a catalyst.

15. The method of claim 14 wherein said catalyst is introduced into said extruder at a point downstream of the introduction of said first part into said extruder but before the introduction of said second part.

16. The method of claim 14 wherein said catalyst is introduced into said extruder at a point downstream of the introduction of said first part into said extruder but after the introduction of said second part.

17. The method of claim 14 wherein said catalyst is combined with said second part.

18. The method of claim 14 wherein said first and second parts form an extruded composition, said method including the step of shaping said extruded composition.

19. The method of claim 14 wherein said coating of said catalyst is a spray coating.

20. The method of claim 14 wherein said pellets are formed into an article for attachment to a component attachable to another component.

21. The method of claim 14 wherein said first polymer of said first part is a di-functional polymer and said second polymer of said first part is a multi-functional polymer.

22. The method of claim 21 wherein said di-functional polymer is a macrodiol and said multi-functional polymer is a macropolyol.

23. The method of claim 21 wherein said di-functional polymer is provided in the amount of between about 40% and about 95% by weight and said multi-functional polymer is provided in the amount of between about 5% and about 50% by weight.

24. The method of claim 14 wherein said first and second polymers have melting points above 40° C.

25. The method of claim 14 wherein said catalyst is a tertiary amine.

26. The method of claim 14 wherein said flow enhancer of said second part is fumed silica.

27. A method of preparing a heat-activatable adhesive pellet for use in bonding a first component to a second component, the method comprising the steps of:
- forming a first mix comprising at least one difunctional polymer and at least one multifunctional polymer, said at least one difunctional polymer and said at least one multifunctional polymer having melting points above 40° C.;
- forming a second mix comprising a flow enhancer and at least one isocyanate selected from the group consisting of a difunctional isocyanate and a multifunctional isocyanate;
- introducing said first mix into an extruder; and
- introducing said second mix into said extruder.

28. The method of claim 27 wherein said second mix is introduced into said extruder after the introduction of said first mix.

29. The method of claim 27 wherein said second mix is introduced into said extruder simultaneous with the introduction of said first mix.

30. The method of claim 27 including the step of extruding the heat-activable adhesive from said extruder and adding a catalyst to the extruded heat-activable adhesive.

31. The method of claim 27 including the step of adding a catalyst to a mix in the extruder.

32. The method of claim 31 including the step of introducing said catalyst with the introduction of said first mix.

33. The method of claim 31 including the step of introducing said catalyst after the introduction of said first mix.

34. The method of claim 31 including the step of introducing said catalyst with the introduction of said second mix.

35. The method of claim 31 including the step of introducing said catalyst after the introduction of said second mix.

* * * * *